(12) United States Patent
Bhandari et al.

(10) Patent No.: US 8,443,376 B2
(45) Date of Patent: May 14, 2013

(54) HYPERVISOR SCHEDULER

(75) Inventors: Aditya Bhandari, Redmond, WA (US);
Dmitry Meshchaninov, Maple Valley, WA (US); Shuvabrata Ganguly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 12/791,790

(22) Filed: Jun. 1, 2010

(65) Prior Publication Data
US 2011/0296406 A1    Dec. 1, 2011

(51) Int. Cl.
*G06F 13/00*    (2006.01)

(52) U.S. Cl.
USPC .............................. 719/312; 718/1; 718/102

(58) Field of Classification Search ....... 719/312; 718/1, 718/102
See application file for complete search history.

(56) References Cited

U.S. PATENT DOCUMENTS

| | | | |
|---|---|---|---|
| 5,287,508 A | 2/1994 | Hejna, Jr. et al. | |
| 6,269,391 B1 | 7/2001 | Gillespie | |
| 7,617,375 B2 | 11/2009 | Flemming et al. | |
| 7,653,909 B2 | 1/2010 | Brenner | |
| 8,276,009 B2* | 9/2012 | King .............................. | 713/320 |
| 2006/0136653 A1 | 6/2006 | Traut et al. | |
| 2006/0136930 A1 | 6/2006 | Kaler et al. | |
| 2006/0150184 A1 | 7/2006 | Hankins et al. | |
| 2006/0206892 A1 | 9/2006 | Vega et al. | |
| 2008/0235690 A1 | 9/2008 | Ang et al. | |
| 2008/0244221 A1 | 10/2008 | Newell et al. | |
| 2009/0055693 A1 | 2/2009 | Budko et al. | |
| 2009/0313445 A1 | 12/2009 | Pandey et al. | |
| 2010/0299671 A1* | 11/2010 | Kinsey .......................... | 718/104 |
| 2011/0055479 A1* | 3/2011 | West et al. .................... | 711/118 |
| 2011/0231857 A1* | 9/2011 | Zaroo et al. .................. | 718/104 |

OTHER PUBLICATIONS

"Chapter1—Intoduction", National Tsing Hua University Institutional Repository, (No Month Available) 2010, 1-6.

Back et al., "Application-Specific System Customization on Many-Core Platforms: The VT-ASOS Framework Position paper", (No Month Available) 2007, 1-6.

Congdon, "Architecture for Hardware Hypervisor Network Offload", ECS 201—Advanced Computer Architecture, (No Month Available) Winter 2008, 23 pages.

Duda et al., "Borrowed-Virtual-Time (BVT) Scheduling: Supporting Latency-Sensitive Threads in a General-Purpose Scheduler", ACM SIGOPS Operating Systems Review, 33(5), Dec. 1999, 261-276.

(Continued)

*Primary Examiner* — Andy Ho
(74) *Attorney, Agent, or Firm* — Woodcock Washburn LLP

(57) ABSTRACT

Techniques for configuring a hypervisor scheduler to make use of cache topology of processors and physical memory distances between NUMA nodes when making scheduling decisions. In the same or other embodiments the hypervisor scheduler can be configured to optimize the scheduling of latency sensitive workloads. In the same or other embodiments a hypervisor can be configured to expose a virtual cache topology to a guest operating system running in a virtual machine.

20 Claims, 13 Drawing Sheets

OTHER PUBLICATIONS

Gavrilovska et al., "High-Performance Hypervisor Architectures: Virtualization in HPC Systems", 1st Workshop on System-level Virtualization for High Performance Computing, Mar. 20, 2007, 8 pages.

MSDN, "Other Scheduling Considerations", Windows Driver Kit, Mar. 19, 2010, 1 page.

Nikolopoulos et al., "VT-ASOS: Holistic System Software Customization for Many Cores", Proceedings of the Workshop on the NSF Next Generation Software Program, held in conjunction with the 22nd IEEE International Parallel and Distributed Processing Symposium, IEEE Computer Society, (No Month Available) 2008, 5 pages.

Ongaro et al., "Scheduling I/O in Virtual Machine Monitors", Proceedings of the fourth ACM SIGPLAN/SIGOPS international conference on Virtual execution environments, Mar. 5-7, 2008, 10 pages.

Vmware, "Best Practices Using VMware Virtual SMP", VMware ESX Server 2, Best Practices Using VMware Virtual SMP, (No Month Available) 2008, 1-8.

Vmware, "ESX Server Performance and Resource Management for CPU-Intensive Workloads", VMware ESX Server 2, Vmware White Paper, Dec. 14, 2005, 1-23.

* cited by examiner

HYPERVISOR SCHEDULER

CROSS REFERENCE TO RELATED APPLICATIONS

This application is related by subject matter to U.S. application Ser. No. 12/791,800 entitled "Expose of Virtual Cache Topology To A Guest Operating System" filed on Jun. 1, 2010, the contents of which are herein incorporated by reference in their entirety.

BACKGROUND

A virtual machine may have one or more virtual processors that are exposed to a guest operating system as single core processors. When a guest operating system runs a workload, it schedules a thread on a virtual processor. A hypervisor runs and schedules a thread that represents the virtual processor on a logical processor of a physical machine that hosts the VM (virtual machine). The workload in the thread runs and some, hopefully useful, work is performed. The hypervisor then runs another thread on the same, or a different logical processor. The hypervisor scheduler thus must determine both when and where to schedule a particular virtual processor. Proper placement of the virtual processors is a key to maintaining high levels of performance.

Currently, hypervisors treat the logical processors the same. For example, a hypervisor may schedule a virtual processor to run in a first NUMA node (Non-Uniform Memory Architecture node) and then move it to another NUMA node. This technique ensures that workloads are run as fast as possible and any overhead due to cache misses is tolerated.

The decision to expose virtual processors as single core processors was made to make virtualization of the physical architecture of the host machine easier. For example, guest operating systems are written so that the topology is checked on boot. If the guest was moved to another host with a different topology it may operate inefficiently because the resources it expects are no longer present.

As systems that include logical processors that share various different caches become more common, it would be beneficial to configure a hypervisor to leverage them. Moreover, it would be beneficial to expose some sort of cache topology to a guest operating system so that the scheduler in the guest operating system can also make intelligent scheduling decisions.

SUMMARY

Techniques are disclosed for configuring a hypervisor to leverage the physical cache topology of a host computer system. In an exemplary embodiment, the hypervisor is configured to make use of processor topology, cache hierarchies, and the distance between memory. For example, in an exemplary embodiment, a method includes an operation for causing a list of idle logical processors to be generated in response to receiving a request to schedule a thread indicative of a virtual processor of a virtual machine; and an operation for causing the thread indicative of the virtual processor to be scheduled on a logical processor from the list that shares a level of cache with a seed logical processor.

In another exemplary embodiment, a method includes an operation for exposing a plurality of single core virtual processors to a virtual machine; an operation for generating a list of idle logical processors in response to receiving a request to execute a thread indicative of a single core virtual processor; an operation for identifying logical processors currently executing threads indicative of single core virtual processors of the virtual machine; and an operation for scheduling the thread indicative of the virtual processor on a logical processor from the list that shares a cache with a maximum number of logical processors currently executing the threads indicative of the single core virtual processors of the virtual machine.

An yet another exemplary embodiment, a method includes an operation for causing a thread indicative of a virtual processor of a virtual machine to be assigned a distinct logical processor to execute thereon; an operation for causing a list of idle logical processors to be generated in response to receiving a request to execute the thread indicative of a virtual processor; and an operation for causing the thread indicative of the virtual processor to be scheduled on a logical processor that shares a level of cache with the distinct logical processor assigned to execute the thread indicative of the virtual processor. In addition to the foregoing, other aspects are described in the claims, drawings, and text forming a part of the disclosed subject matter.

It can be appreciated by one of skill in the art that one or more various aspects described herein may include but are not limited to circuitry and/or programming for effecting the herein-referenced aspects described herein; the circuitry and/ or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
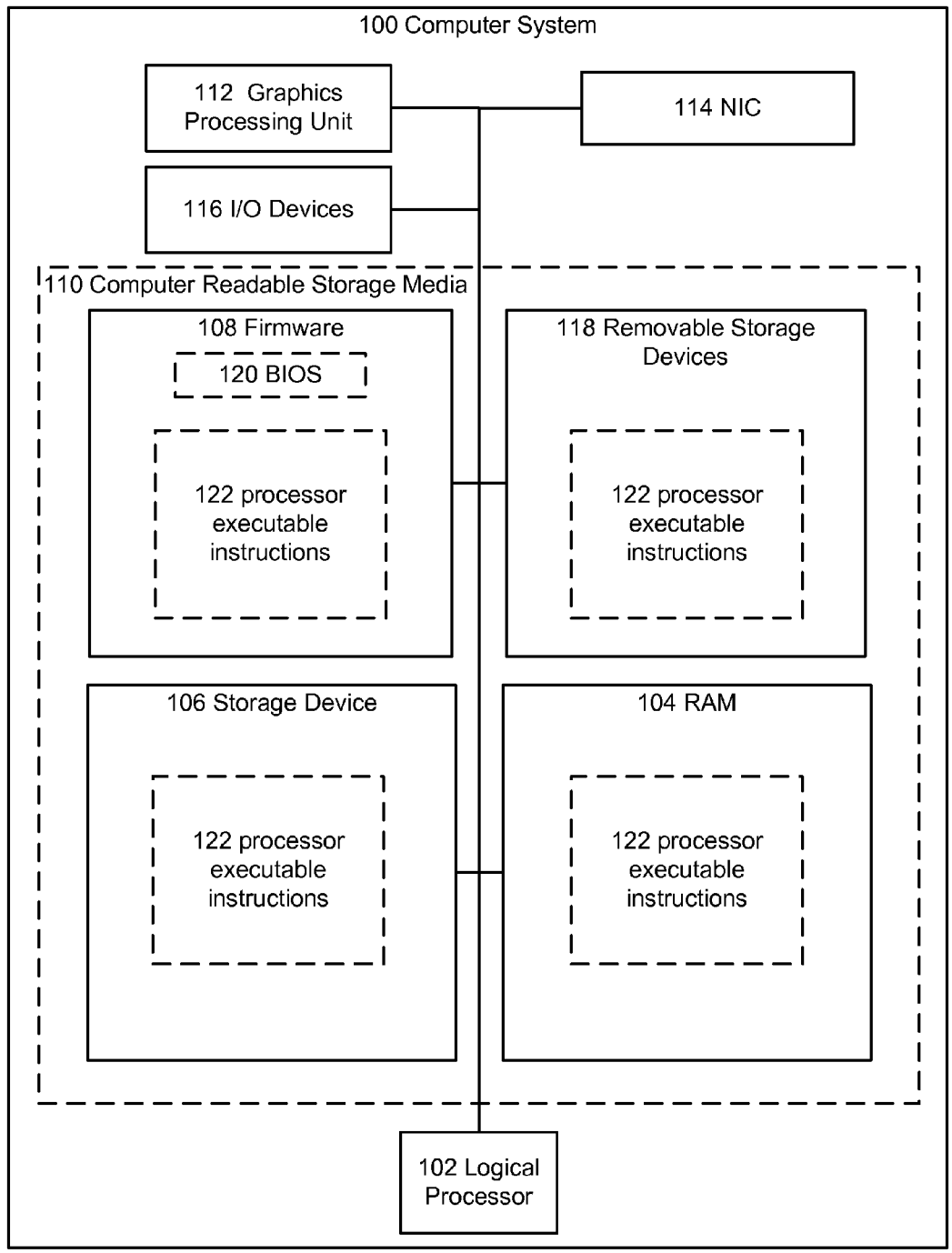
FIG. 1 depicts an example computer system wherein the subject matter described herein can be implemented.

Embodiments may execute on one or more computer systems. FIG. 1 and the following discussion are intended to provide a brief general description of a suitable computing environment in which the disclosed subject matter may be implemented.

The term circuitry used throughout the description can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by instructions read from firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software, an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses that couple various system components to the logical processor 102. The system buses may be any of several types of bus structures including a memory bus or memory controller, a peripheral bus, and a local bus using any of a variety of bus architectures. In example embodiments, the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer readable storage media 110 can provide non volatile and volatile storage of executable instructions 122, data structures, program modules and other data for the computer 100 such executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor unit 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the disclosed subject matter are particularly well-suited for computerized systems, nothing in this document is intended to limit the disclosed subject matter to such embodiments.

Figure 2:
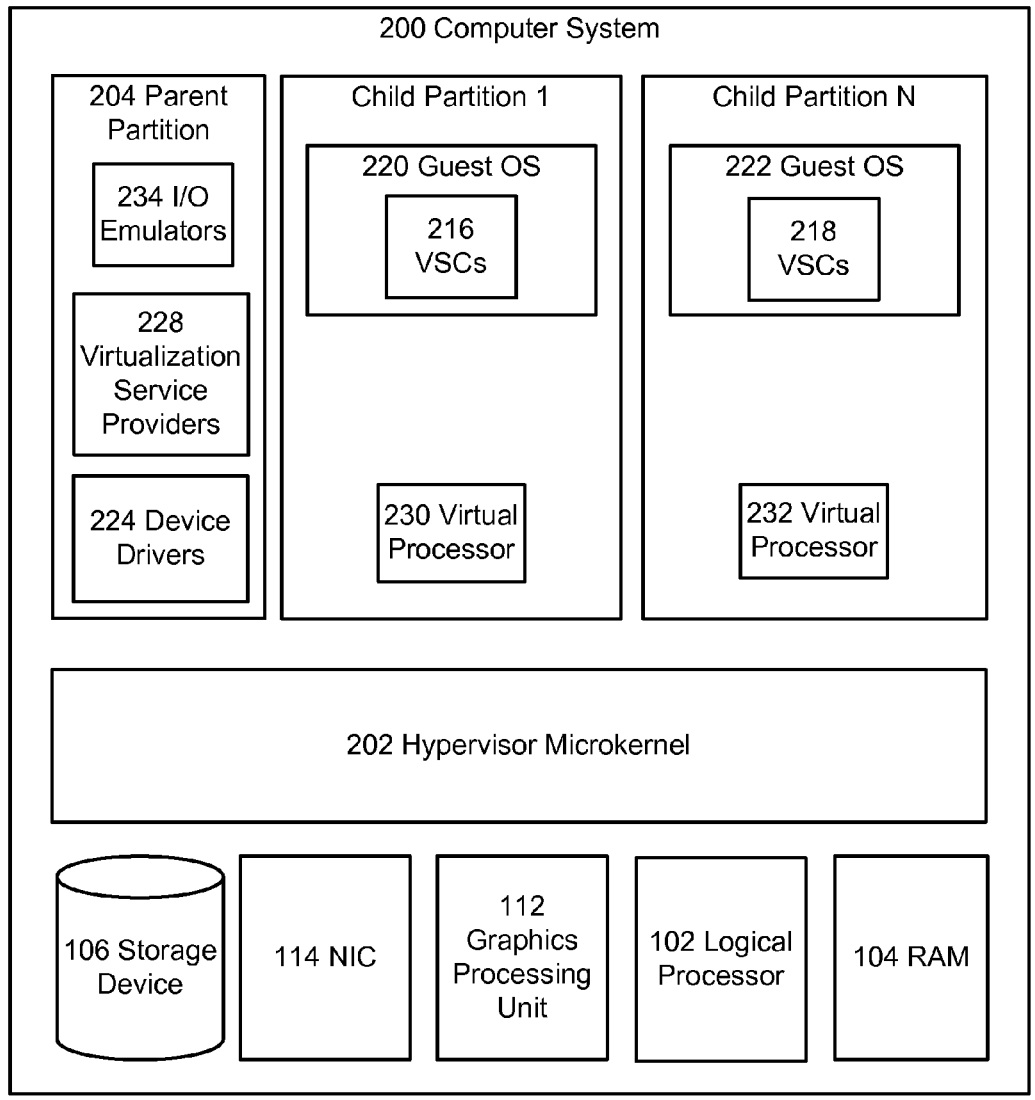
FIG. 2 depicts an operational environment wherein the subject matter described herein can be implemented.

Turning to FIG. 2, hypervisor microkernel 202 can be configured to control and arbitrate access to the hardware of computer system 200. Broadly, hypervisor microkernel 202 can generate execution environments called partitions such as child partition 1 through child partition N (where N is an integer greater than 1). In embodiments a child partition is the basic unit of isolation supported by hypervisor microkernel 202. That is, each child partition can be mapped to a set of hardware resources, e.g., memory, devices, logical processor cycles, etc., that is under control of the hypervisor microkernel 202 and hypervisor microkernel 202 can isolate processes in one partition from accessing another partition's resources, e.g., a guest operating system in one partition may be isolated from the memory of another partition and thus may not be able to detect memory addresses outside of it's partition. In embodiments, hypervisor microkernel 202 can be a standalone software product, a part of an operating system, embedded within firmware of the motherboard, one or more specialized integrated circuits, or a combination thereof.

Hypervisor microkernel 202 can enforce partitioning by restricting a guest operating system's view of system memory. Guest memory is a partition's view of memory that is controlled by a hypervisor. The guest physical address can be backed by system physical address (SPA), i.e., the memory of the physical computer system, managed by hypervisor. In an embodiment, the GPAs and SPAs can be arranged into memory blocks, i.e., one or more pages of memory. When a guest writes to a block using its page table, the data is actually stored in a block with a different system address according to the system wide page table used by hypervisor.

In the depicted example, parent partition component 204, which can also be also thought of as similar to domain 0 of Xen's open source hypervisor, can interact with hypervisor microkernel 202 to provide a virtualization layer. Parent partition 204 in this operational environment can be configured to provide resources to guest operating systems executing in the child partitions 1-N by using virtualization service providers 228 (VSPs) that are typically referred to as back-end drivers in the open source community. Broadly, VSPs 228 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure emulators 234, e.g., virtualized integrated drive electronics device (IDE devices), virtualized video adaptors, virtualized NICs, etc., can be configured to run within the parent partition 204 and are attached to resources available to guest operating systems 220 and 222. For example, when a guest OS touches a register of a virtual device or memory mapped to the virtual device 202, microkernel hypervisor can intercept the request and pass the values the guest attempted to write to an associated emulator.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processors execute hypervisor instructions. The combination of virtual processors and memory in a partition can be considered a virtual machine.

Guest operating systems can include any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
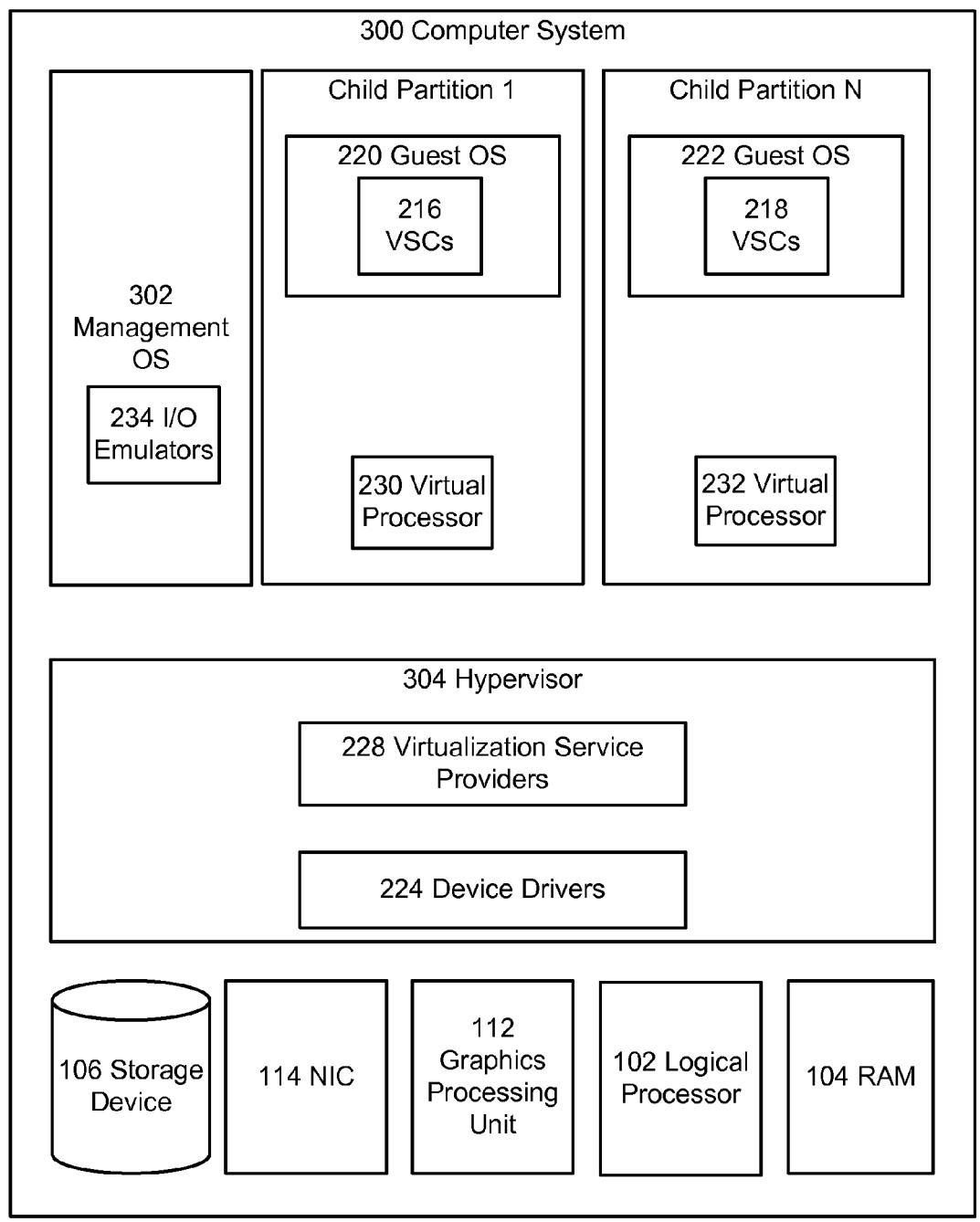
FIG. 3 depicts an operational environment wherein the subject matter described herein can be implemented.

Referring now to FIG. 3, it illustrates an alternative architecture to that described above in FIG. 2. FIG. 3 depicts similar components to those of FIG. 2; however in this example embodiment the hypervisor 304 can include the microkernel component and components from the parent partition 204 of FIG. 2 such as the virtualization service providers 228 and device drivers 224 while management operating system 302 may contain, for example, configuration utilities used to configure hypervisor 304. In this architecture hypervisor 304 can perform the same or similar functions as hypervisor microkernel 202 of FIG. 2; however, in this architecture hypervisor 304 can be configured to provide resources to guest operating systems executing in the child partitions.

Hypervisor 304 of FIG. 3 can be a stand alone software product, a part of an operating system, embedded within firmware of the motherboard or a portion of hypervisor 304 can be effectuated by specialized integrated circuits.

Figure 4:
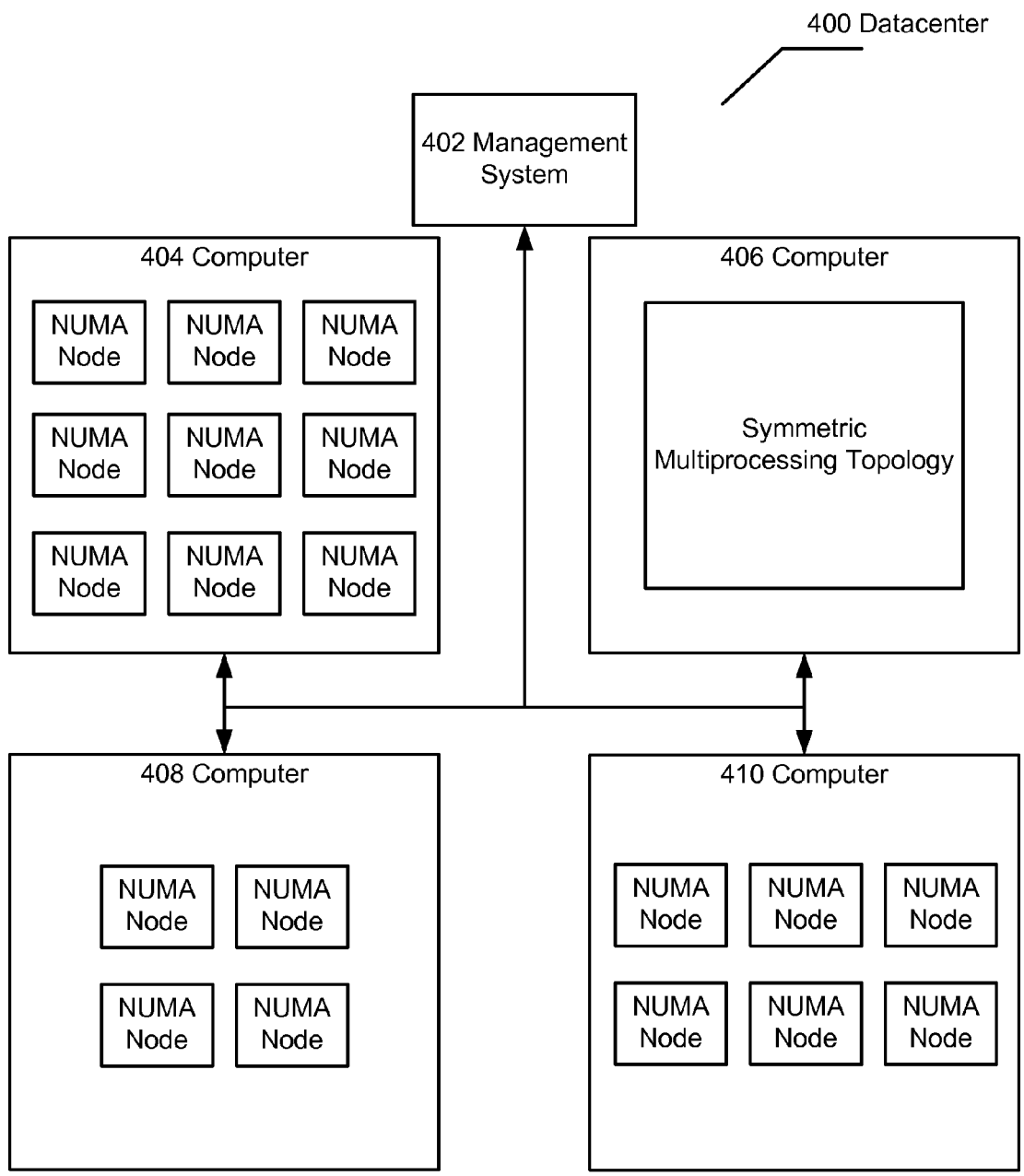
FIG. 4 illustrates a datacenter wherein the subject matter described herein can be implemented.

Briefly, FIG. 4 depicts an operational environment for implementing the disclosed subject matter. For example, a number of computer systems 404-410 can be coupled together in a datacenter 400 (While four computer systems are depicted, one of skill in the art can appreciate that datacenter 400 can include more or fewer computer systems). The depicted computer systems can have different topologies and, moreover, they can have different characteristics, e.g., different amounts of RAM, different RAM speeds, different amount of logical processors, and/or logical processors with different speeds or instruction sets.

As shown by the figure, computer system 406 has a symmetric multiprocessing topology (SMP) or a 'flat' topology. Generally, SMP is a computer architecture that includes a plurality of processors that are connected to a single shared memory. In this arraignment, a memory controller can manage the flow of data to and from memory. Memory access may be uniform with respect to each logical processor and each logical processor can access the entire range of memory, i.e., system physical addresses. This topology works well for computer systems with a relatively small number of processors, but when the computer system includes many processors, all competing for access to the shared memory bus, performance of the system can decrease. Moreover, the complexity of the computer system significantly increases which in turn drives the price per processor up.

Computer systems 404, 408, and 410 have NUMA nodes. NUMA based computer systems are can be generally though of as computers that are made up of smaller computer systems. In this example, each NUMA node can include one or more logical processors and local memory. The memory inside of a NUMA node is considered local memory and memory in other NUMA nodes is considered remote memory because the only the processors inside of the node are connected to the same memory bus. The NUMA nodes are interconnected by cache coherency domain interconnects which allow processors in one NUMA node to access memory in other NUMA nodes in a coherent way. Thus, system physical addresses are uniform with respect to each processor. Or put another way, system physical address 20,000 is the same for every processor in the computer system. The difference is that for some processors memory address 20,000 is a local memory address, e.g., inside their NUMA node, and for other processors memory address 20,000 is remote, e.g., outside their NUMA node. Generally, local memory can be accessed faster than remote memory and the relationship between local v. remote access time is called a NUMA ratio. A NUMA ratio of 1 to 2 means that it costs twice as many processor cycles to access a particular remote system physical address than a local system physical address. NUMA alleviates bottlenecks caused by SMP systems by limiting the number of processors on any one memory bus and is generally less expensive than a SMP computer system with the same amount of logical processors.

Figure 5:
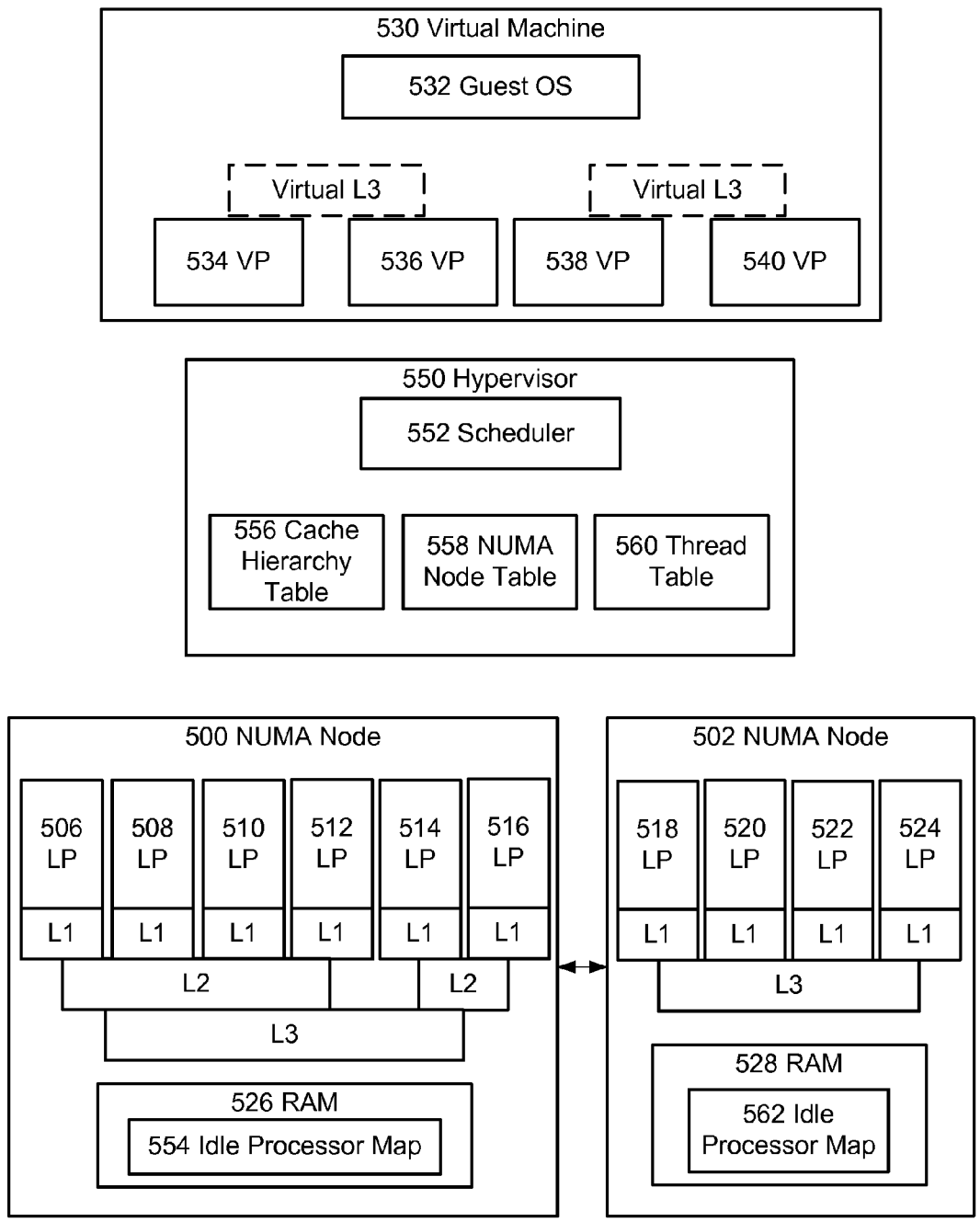
FIG. 5 depicts an operational environment wherein the subject matter described herein can be implemented.

Turning to FIG. 5, it illustrates an operational environment wherein the disclosed subject matter can be implemented. As one skilled in the art can appreciate, the disclosed subject matter does not have to be implemented in a computer system having the illustrated architecture. Instead, the illustrated architecture is merely an exemplar used to explain concepts. Accordingly, the disclosed subject matter can be incorporated into different environments including different amounts of NUMA nodes, virtual machines, cache topologies, logical processors, etc.

FIG. 5 shows two example NUMA nodes (500 and 502) connected by a cache coherency domain interconnect. The illustrated NUMA nodes have different cache topologies. For example, each processor in NUMA node 500 shares level 3 ("L3") cache and two groups of processors share a level 2 ("L2") cache. Each processor (506-516) is shown with its own level 1 ("L1") cache. Logical processors (518-524) in NUMA node 502 share a level 3 cache and have their own level 1 cache. Those of skill in the art can appreciate that the illustrated cache topologies are for illustration purposes only and the disclosed subject matter is not limited to being implemented in a system with any particular cache topology. Each NUMA node (500 and 502) is also shown as including its own random access memory (526 and 528).

Processor cache is typically used for temporary storage of instructions and data herein referred to as information. When a request is made, a logical processor requires instructions for executing that request and data to execute the instruction with. Since the logical processor operates at speeds greater than RAM, high speed caches have been added to processors and algorithms have been devised to anticipate what information a logical processor will need and attempt to store it in caches. Typically, level 1 cache is very small, which allows it to be very fast having latency times of, for example, two cycles, i.e., the number of processor cycles needed to access the memory and retrieve the information. If the information is not present in L1 cache, a cache miss occurs and the logical processor checks its L2 cache, which is a slightly larger pool of memory with a little longer latency of around, for example, nine cycles. If the data is not in L2 or L1, the logical processor checks its L3 cache. L3 cache is far larger than L1 and L2 and its latency is, for example, twenty three cycles. With each cache miss logical processor looks to it's next level of cache until it has to fetch the information from RAM or mass storage.

Hypervisor 550, i.e., microkernel hypervisor 202 of FIG. 2 or hypervisor 304 of FIG. 3, can include scheduler 552 which can be configured to schedule threads indicative of virtual processors to run on one of the logical processors (506-516 or 518-524). In order to determine how to schedule an incoming thread, hypervisor scheduler 552 can access various information (554-562) described in more detail below.

Thread table 560, which could be a data structure stored in memory, can store information about the different virtual processor threads. When a request to run a virtual processor is received, scheduler 552 can access thread table 560 and retrieve information about the virtual processor in order to determine where and how to schedule it. For each virtual processor, thread table 560 may store, for example, a timestamp identifying when the thread last ran, whether the thread has been identified to be a latency sensitive thread, the logical processor the thread last ran on, the identity of an ideal processor for the thread, the NUMA node the thread last ran in, information that describes the identity of related virtual processor threads, etc.

In an exemplary embodiment, thread table 560 can be used by scheduler 552 to schedule virtual processor threads. For example, scheduler 552 can be configured to select an idle processor to run an incoming thread that is located within a seed NUMA node, e.g., an ideal NUMA node, or the node that last ran the thread. In this example embodiment, scheduler 552 can check thread table 560 to determine the seed NUMA node for an incoming thread request and schedule the thread on the seed NUMA node.

In a specific example, each NUMA node can maintain a per-NUMA node idle processor map (554 and 562). For example, an idle processor map can be a bitmap where each bit represents a logical processor. When a logical processor runs a thread, it can set the bit and when it finishes running the thread, it can reset the bit. The idle processor map can be used by scheduler 552 to determine which logical processors are idle. In an exemplary embodiment, the bitmap can be broken into multiple maps: one for each NUMA node in the computer system stored in the NUMA node. This embodiment reduces the collisions on the map because it reduces the number of processors attempting to access the same memory to set and reset bits.

Moreover, by maintaining a map for each NUMA node, scheduler 552 can quickly remove logical processors from a list of candidates by checking the idle processor map associated with a specific NUMA node. For example, an incoming thread may have its seed NUMA node set as NUMA node 500 in thread table 560, i.e., the thread may have last ran on that node or a processor in the node is set as an ideal processor. Scheduler 552 can receive this information and search idle processor map 554 for an idle processor. In this example scheduler 552 eliminated logical processors 518-524 from a list of candidates without having to access idle processor map 562 or process any information in it.

In the event that the seed NUMA node does not have an idle processor, scheduler 552 can be configured to search for an idle processor from the next closest NUMA node by accessing information in NUMA node table 558, which can be a data structure stored in memory. For example, NUMA node table 558 can include a node distance graph for each NUMA node in the computer system. Hypervisor 550 can generate an array that ranks the NUMA nodes according to memory distance. For example, the graph for NUMA node 500 would show that NUMA node 502 is close. Hypervisor 550 can generate the graph for each node when the host system boots. For example, hypervisor 550 can direct each logical processor in a NUMA node to access RAM from all the other nodes in the host; record the round trip times and rank the times from best to worst; the best time indicating the closest node and the worst time indicating the farthest node.

Once a NUMA node is selected by scheduler 552, various algorithms can be used to select a specific logical processor. In a simple example, one where the virtual machine has one virtual processor, scheduler 552 can determine the seed logical processor for a thread and if that thread is unavailable, scheduler 552 can access a cache hierarchy table 556 to determine where to schedule the thread. Cache hierarchy table 556 can include an array of bitmaps for each logical processor that describes how it shares caches with other logical processors in its NUMA node. For example, logical processor 506 may have 3 arrays (one for L1, L2, and L3 caches) an L1 array that has a bit set for logical processor 506 and nulls for 508-516, an array for L2 that has a bit set for LP 506-510, and an array for L3 that shows bits set for LPs 506-516. In an example, scheduler 552 can be configured to select an idle logical processor that shares a highest level of cache with the seed. For example, if the seed is LP 506 scheduler 552 could select LP 508, LP 510, or LP 512 if any is idle since L2 is the highest cache these processors share.

In an exemplary embodiment, the seed logical processor can be set to the last processor that ran the thread. For example, if a virtual machine includes one logical processor it most efficiently runs on the logical processor that last ran it because this logical processor has the highest chance of having information the virtual processor needs in its cache. In this example embodiment as the virtual processor is moved the seed can be changed to the logical processor that last ran it.

The complexity of the scheduling algorithm can increase as the number of virtual processors assigned to a virtual machine increases. For example, when a virtual machine includes multiple virtual processors it has been noticed by the inventors that they tend to use the same information. Thus, if the virtual processors are scheduled on logical processors that share caches the number of cache hits increases which causes the guest to run more efficiently. In this example, scheduler 552 can select logical processors to run virtual processors of a virtual machine in such a way that the virtual processors share physical caches. This technique reduces the chance that cache misses occur and in the event that one does occur, the information fetched for one virtual processor can be used by the other virtual processors. This technique additionally reduces coherence miss costs. For example, if a virtual processor needs exclusive access to the cache line, the cost of transferring the cache line from the logical processor running the virtual processor to another logical processor is reduced since the information can be moved through their shared cache rather than having to be written all the way back to memory or sent through an inter-socket bus.

In an exemplary embodiment, one where multiple virtual processors are executing within a virtual machine, each virtual processor can be assigned a seed logical processor set by an administrator or automatically by a configuration program. For example, virtual processor 534 could have LP 506 set as its ideal and virtual processor 536 could have its ideal LP set to be LP 508. When scheduler 552 attempts to schedule virtual processor 534, scheduler 552 will determine that it's ideal is LP 506 and attempt to schedule it on LP 506. Since scheduler 552 is attempting to keep threads on their ideal logical processors the number of cache hits will be increased.

In another example embodiment scheduler 552 may not use a seed. Instead, hypervisor scheduler 552 can select an idle logical processor based on the location of threads of other virtual processors in a virtual machine such as virtual machine 530. In this example, scheduler 552 can be configured to select a logical processor that it estimates will have the smallest estimated miss cost. A cache miss occurs when a logical processor attempts to access information from a cache and the information is not in cache. The miss cost is the amount of cycles that would be wasted if information is not in cache. In this example embodiment scheduler 552 can select the logical processor that has the lowest estimated miss cost.

For example, scheduler 552 can be configured to select an idle processor that shares cache with a maximum number of logical processors currently running virtual processors of a virtual machine. In the same, or another example, scheduler 552 can be configured to select an idle processor that shares a maximum number of caches with a maximum number of logical processors currently running virtual processors of a virtual machine. In yet another exemplarily embodiment, scheduler 552 can be configured to select the logical processor that shares the highest level of cache with the most logical processors currently running virtual processors of a virtual machine. For example, and referring to FIG. 5, in an embodiment virtual processor 534 may be running on logical processor 506, virtual processor 536 may be running on logical processor 508 and virtual processor 538 may be running on logical processor 514. In this example scheduler 552 may receive a request to run virtual processor 540. Scheduler 552 can check idle processor map 554 and determine that logical processors 510 and 516 are free. In this example scheduler 552 can access cache hierarchy table 556 and obtain the arrays for logical processors 510 and 516. Scheduler 552 can determine, based on information in the arrays, that logical processor 510 shares L3 cache with LP 506, LP 508, and LP 514 and logical processor 516 share L3 cache with the same LPs. In the first example above, scheduler 552 may select either LP 510 or 514. In the alternative embodiment described above, scheduler 552 can select LP 510 since it shares L2 cache with LP 506 and 508 as well as L3 cache with LP 506, LP 508, and LP 514. In this example LP 510 shares 5 caches with LP 510 whereas LP 514 shares 3. In the third example, scheduler 552 can select LP 510 since it shares L2 cache with LP 506 and 508.

In another example embodiment scheduler 552 can be configured to handle latency sensitive workloads differently than regular workloads when scheduling. Typically virtual processors belonging to latency sensitive guests are scheduled as soon as possible. However in this case if the last logical processor a virtual processor ran on is unavailable, the virtual processor would be migrated elsewhere and the positive effects of having cache hits would be lost. In an example embodiment scheduler 552 can be configured to maximize locality while simultaneously limited latency without affecting non-latency sensitive workloads.

For example, when hypervisor 550 receives a request to schedule a latency sensitive thread, scheduler 552 can determine if there are any logical processors that share cache with the last logical processor that ran the thread and select one. For example, the selected logical processor could be the logical processor that shares the highest level of cache with the processor that last ran the thread. If, no logical processors that share cache are available, scheduler 552 can determine the amount of time since the virtual processor last ran and compare it to a predetermined threshold. If the amount of time since it is last ran is greater than the threshold the virtual processor can be migrated, otherwise it can be queued to run on the logical processor that last ran the thread. If the amount of time since the virtual processor last ran is greater than the threshold, it is assumed that useful information is not in cache. If the amount of time since it last ran is less than the threshold, the assumption is that cache still contains useful information. One skilled in the art can appreciate that the predetermined threshold can be set by a policy or an administrator and is dependent on the physical hardware and workload characteristics of the virtual machine. Over time an administrator or policy can adjust the predetermined threshold and monitor how efficiency increases or decreases until an optimum value is found for a particular host running a particular workload. Moreover, Continuing with the description of FIG. 5, in an embodiment, a virtual cache topology can be exposed to virtual machines. In this example embodiment hypervisor 550 can generate a virtualized topology that can be exposed to the guest. Hypervisor 550 can construct a topology that can be reasonably honored by the host computer system and, for example, any other computer system in a datacenter. This allows for a scheduler in the guest operating system to make intelligent scheduling decisions while maintaining the abstraction between hardware and virtual hardware.

For example, in an embodiment where virtualized topology is exposed to guest operating system 532, hypervisor 550 can detect the cache topology of the host computer system during boot. In an example embodiment, one where the host is by itself, hypervisor 550 can be configured to compute a virtual cache topology that can be honored by at least most of the logical processors in the computer system. In a datacenter, the host computer can send cache topology to management system 402 along with all the other computers in the datacenter. Management system 402 can then calculate a virtual topology that can be honored by at least most of the computer systems. The topology can be received by hypervisor 550 which can effectuate a virtual machine having the topology.

In a specific example, hypervisor 550 or management system 402 can calculate a virtual topology. For example, hypervisor 550 or management system 402 can calculate a virtual topology by determining an amount of logical processors shared by a cache; expose the determined number to guest operating system; and expose a cache interconnecting the determined number that is the lowest type of cache that can be honored.

In an exemplary embodiment, and turning to FIG. 5, hypervisor 550 or management system 402 can calculate a virtual cache topology by determining an amount of logical processors shared by a cache (sharing cardinality); expose the sharing cardinality to a guest operating system; and expose a cache interconnecting the determined number that is the highest level of cache that can be honored (sharing level) to a guest operating system.

In one method of calculating sharing cardinality, the sharing cardinality is set as the minimum number of LPs sharing the lowest level of cache in a NUMA node. For example, and referring to FIG. 5, in the illustrated embodiment, hypervisor 550 could detect that six LPs in NUMA node 500 and four LPs in NUMA node 502 share the lowest level cache (L3). Hypervisor 550 (or in a datacenter example, the management system 402) can then determine that the minimum amount of logical processors that share the lowest level of cache in the cluster is four, e.g., LPs 518-524 share L3. In this example, hypervisor 550 can select L3 as the type of cache to expose because hypervisor 550 (or management system 402) determines the sharing level as the highest level of cache at which there are at least sharing cardinality number of cache sharing LPs. Thus, as illustrated by FIG. 5, in this example, hypervisor 550 can expose groups of four virtual processors that share a virtual L3 cache. Hypervisor 550 can then store the information in cache hierarchy table 556.

In another method of calculating sharing cardinality, the sharing cardinality is the greatest common divisor of each NUMA node's number of LPs sharing the lowest level of cache in each cluster. For example, and referring to FIG. 5, in the illustrated embodiment, hypervisor 550 could detect the numbers of logical processors that as a group share the lowest level of cache in the cluster. In this example, NUMA node 500 includes six LPs (LPs 506-516) that share the lowest level cache, L3, and in NUMA node 502, four LPs (LPs 518-524) share the lowest level cache, L3. Hypervisor 550 (or in a datacenter example, the management system 402) then determines that the greatest common divisor of the two groups, six processors and four processors, is two processors. Hypervisor 550 (or management system 402) then determines that the highest level of cache in each NUMA node at which there are at least the determined number of processors (two in this example) is L3. In this example, hypervisor 550 can select L3 as the type of cache to expose. Thus, as illustrated by FIG. 5, in this example, hypervisor 550 can expose groups of two virtual processors that share a virtual L3 cache. Hypervisor 550 can then store the information in cache hierarchy table 556.

After the virtual cache topology is determined (and passed by management system 402 to hypervisor 550, in the case of a datacenter), it can be used by scheduler 552 when scheduling threads. In one embodiment, hypervisor 550 can set ideal logical processors for virtual processors in a way that honors the virtual cache topology. For example, and continuing the specific example from above, hypervisor 550 can set LP 506 as the ideal processor for VP 534 and LP 508 as the ideal processor for VP 536. Hypervisor 550 can then expose L2 cache between LP 506 and 508 as a virtual L3 cache. In this example embodiment as long as scheduler 552 can schedule VP 534 or VP 536 on any combination of logical processors in NUMA node 500 or NUMA node 502 the virtualized topology is honored. Moreover, if the physical cache being virtualized is an L2, guest operating system 532 may observe a performance increase.

In another example, hypervisor 550 can keep track of where virtual processors are executing and select a logical processor based on the exposed virtual topology and estimated cache miss cost associated with the available logical processors. Scheduler 552 can then determine the identities of the logical processors running other threads of virtual machine 530 and use this information to select a logical processor that honors the virtual cache topology and has the lowest estimated miss cost.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 6:
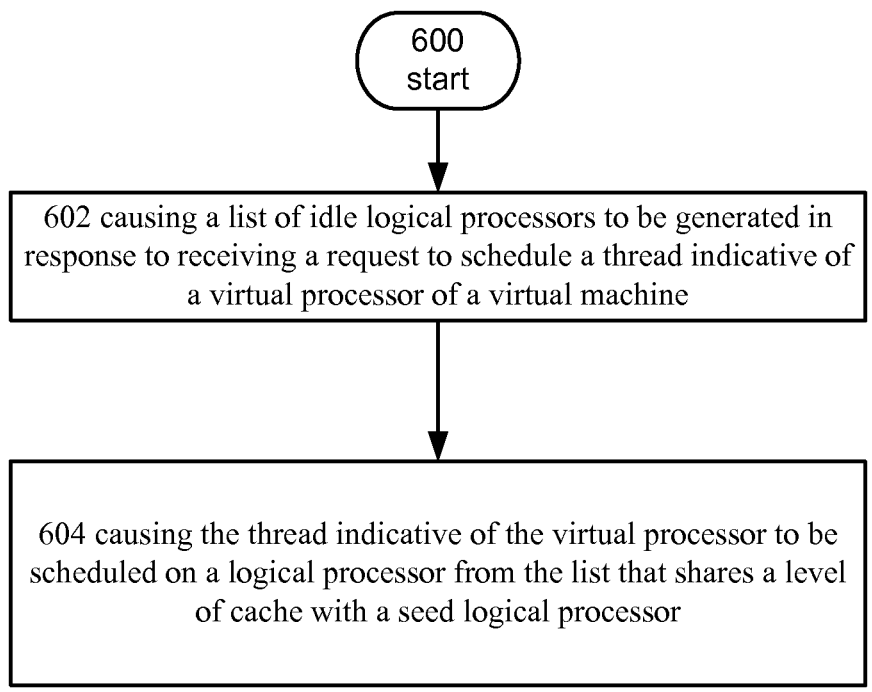
FIG. 6 depicts operational procedure.

Turning now to FIG. 6, it illustrates an operational procedure including operations 600, 602, and 604. Operation 600 begins the operational process and operation 602 illustrates causing a list of idle logical processors to be generated in response to receiving a request to schedule a thread indicative of a virtual processor of a virtual machine. For example, and turning to FIG. 5, hypervisor 550 can be configured to instantiate and control virtual machine 530 and expose one or more virtual processors such as VP 534-VP540 to guest operating system 532. For example, a guest operating system can issue an instruction querying the virtual topology. This instruction can be intercepted by hypervisor 550 and virtualized. As shown by the dashed lines for virtual L3 cache, in an example embodiment virtual processors 534-540 may be single core virtual processors and the virtual L3 cache may not exist. Or put another way, in this example, a virtualized topology may not be exposed to guest operating system 532. In this example, guest operating system 532 may schedule a thread on virtual processor 534 and hypervisor 550 can receive a request to schedule virtual processor 534 on a logical processor. In response to receiving the request scheduler 552 can execute and generate a list of idle logical processors. In an example embodiment scheduler 552 could check an idle processor map and determine which processors in the system are idle.

Turning to operation 604, it shows causing the thread indicative of the virtual processor to be scheduled on a logical processor from the list that shares a level of cache with a seed logical processor. Continuing with the example above, scheduler 552 can execute and schedule the thread on a logical processor that shares a level of cache with a seed logical processor. For example, in this example embodiment scheduler 552 can attempt to schedule the thread on a logical processor that is close to a seed logical processor. In this example, scheduler 552 can increase performance of virtual machine 530 by increasing the chance that the thread will use data or instructions that are in the shared cache and the logical processor can run without having to fetch data or instructions from RAM or another NUMA node.

Continuing from the specific example above, scheduler 552 can determine that the seed for thread indicative of virtual processor 534 is logical processor 506. In the event that logical processor 506 is unavailable, scheduler 552 can then be configured to access cache hierarchy table 556 and determine which idle logical processors share cache with logical processor 506. Scheduler 552 can then be configured to select one of the logical processors that shares cache to run thread indicative of VP 534. For example, LP 508 and LP 514 may be idle. Scheduler 552 can access cache hierarchy table 556 and determine LP 508 shares L2 and L3 with LP 506 and LP 506 shares L3 cache with LP 514. Scheduler 552 can then select one of the logical processors to run the thread.

Figure 7:
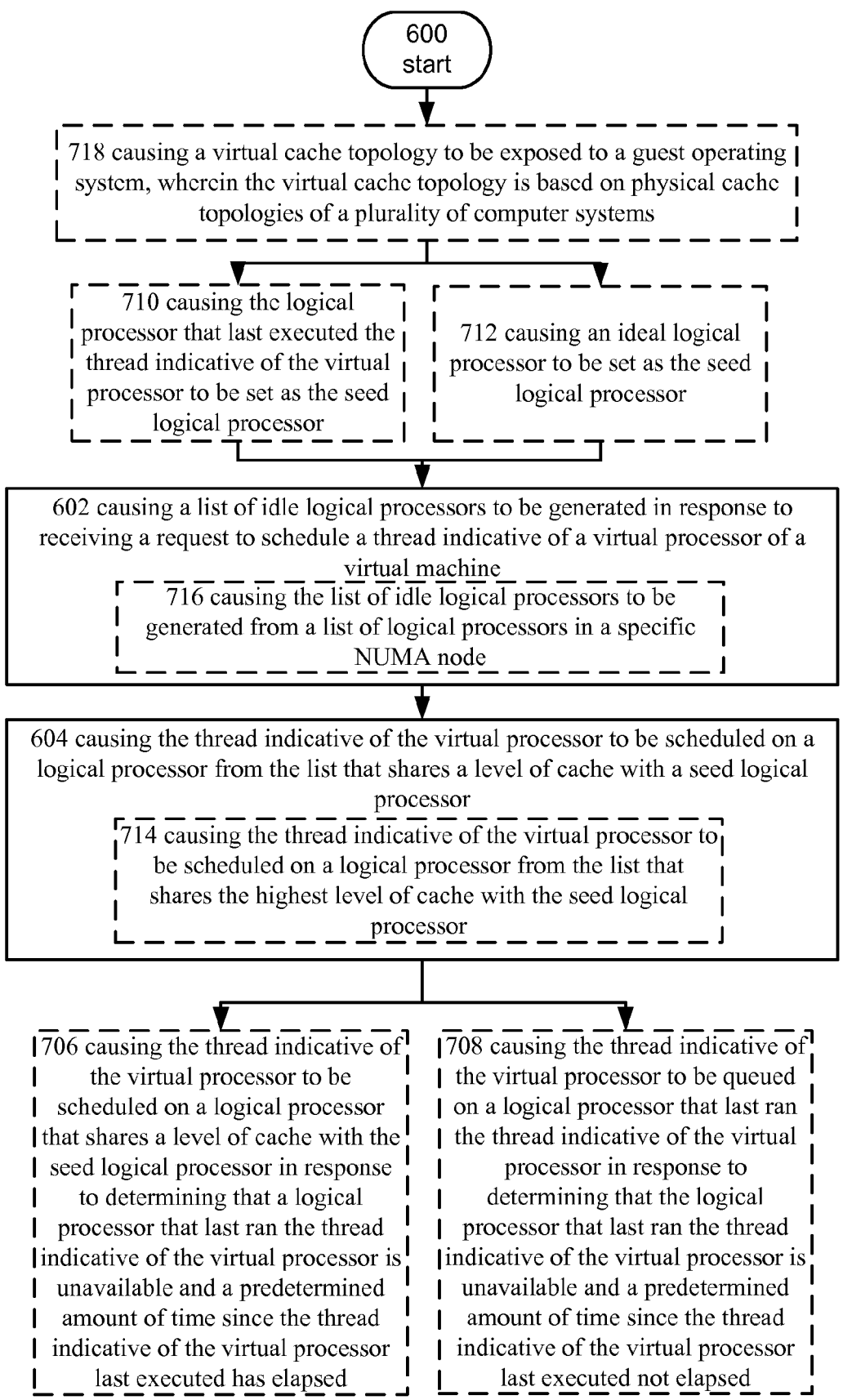
FIG. 7 depicts an alternative embodiment of the operational procedure of FIG. 6.

Turning now to FIG. 7, it illustrates an alternative embodiment of the operational procedure of FIG. 6 including the additional operations 706-718. Operation 706 shows causing the thread indicative of the virtual processor to be scheduled on a logical processor that shares a level of cache with the seed logical processor in response to determining that a logical processor that last ran the thread indicative of the virtual processor is unavailable and a predetermined amount of time since the thread indicative of the virtual processor last executed has elapsed. For example, scheduler 552 may determine that the thread indicative of virtual processor 534 is associated with a latency sensitive workload. That is, the workload, e.g., the program executed by guest operating system 532, may need to be scheduled as soon as possible when the guest runs it on the virtual processor. For example, hypervisor 550 may obtain performance information from guest 532 indicating that its performance is sluggish or guest OS 532 is performing a lot of network based input/output work. In another embodiment, an administrator or policy could set threads from virtual machine 530 as latency sensitive. Regardless of how the thread was identified as latency sensitive, scheduler 552 can obtain information from thread table 560 when a request to schedule thread indicative of virtual processor 534 is received and determine how to schedule it.

In an example embodiment, scheduler 552 can immediately schedule the thread, or queue it depending on when the thread last ran. For example, if the thread recently ran, there is a chance that information it would use is still in cache. In the instance where the information is still in cache, the performance hit due to queuing may be less than the performance hit due to having a cache miss. Alternatively, if thread has not run recently, then the cache may be cold, i.e., may not have any useful information, and no performance benefits would be obtained by waiting any longer.

In this example, a predetermined threshold time can be used to determine that the thread should be run. For example, scheduler 552 can receive a request to schedule virtual processor 534. Scheduler 552 can run and access thread table 560 to obtain information regarding virtual processor 534 such as information that describes that the thread is latency sensitive, a time that thread last ran, and the logical processor that last ran thread indicative of virtual processor 534. Scheduler 552 can access an idle processor map and check to see what logical processors are available. In this specific example, the logical processor that last ran the thread, e.g., LP 506, may be unavailable. In this situation, scheduler 552 can compare the amount of time since virtual processor 534 last ran to a predetermined threshold and determine that the amount of time since it last ran is greater than the predetermined value. Schedule 552 can be scheduled to access cache hierarchy table 556 and determine which available logical processors share cache with logical processor 506 and select one to run thread 534.

Continuing with the description of FIG. 7, operation 708 shows causing the thread indicative of the virtual processor to be queued on a logical processor that last ran the thread indicative of the virtual processor in response to determining that the logical processor that last ran the thread indicative of the virtual processor is unavailable and a predetermined amount of time since the thread indicative of the virtual processor last executed not elapsed. Similar to operation 706, thread indicative of virtual processor 534 could be a latency sensitive thread. In this example, scheduler 552 can be configured to queue thread 534 on logical processor 506 in the instance that logical processor 506 is unavailable and the predetermined amount of time has not elapsed. In this example, a decision can be made that the savings do to obtaining cache hits will offset the fact that the latency sensitive thread is not executed as soon as possible. As stated above, the predetermined threshold can be set based on performance characteristics of the system and may be adjusted by an administrator or a policy.

Operation 710 of FIG. 7 shows causing the logical processor that last executed the thread indicative of the virtual processor to be set as the seed logical processor. For example, in an embodiment an administrator or a policy can be used by hypervisor 550 to set a seed logical processor for a virtual processor. In a specific example, the logical processor that last ran virtual processor 534 can be set as the seed. Thus, in this example embodiment, if thread 534 is moved from logical processor 506 to logical processor 508, the seed can be changed in thread table 560 to reflect that the seed is now logical processor 508. In this example, virtual machine 530 may be a single core virtual machine 530 and the only efficiency that can be obtained from cache hits is from configuring virtual processor 534 to share as many caches with the logical processor that last ran it.

Turning to operation 712, it shows causing an ideal logical processor to be set as the seed logical processor. For example, and turning to FIG. 5, an ideal logical processor can be set as the seed. In this example, the seed could be statically assigned at boot based on a policy or by an administrator. In this example, the seed can remain constant even if threads indicative of virtual processors are moved by scheduler 552. For example, virtual machine 530 can be instantiated. A policy could be read by hypervisor 550 that directs it to set ideal processors for virtual processors 534-540. In response, hypervisor 550 can assign logical processor 506 as the ideal for virtual processor 534, logical processor 508 as the ideal for virtual processor 536 and so on and so forth. This information can then be recorded in thread table 560. In the event that virtual processor 534 is moved the next time it runs scheduler 552 can be configured to access thread table 560; determine that LP 506 is set as an ideal LP; and check to see if LP 506 is free. In this example, if LP 506 is free it is scheduled thereon regardless of the identity of the last LP that ran VP 534. If it unavailable, scheduler 552 attempts to locate it as close as possible to the ideal LP.

Turning to operation 714, it shows causing the thread indicative of the virtual processor to be scheduled on a logical processor from the list that shares the highest level of cache with the seed logical processor. For example, in an example scheduler 552 can be configured to attempt to collocate virtual processors such that they share the highest level of cache. In this example, guest 532 has the best chance of seeing a performance increase due to cache hits. As described above, each logical processor can have arrays associated therewith stored in cache hierarchy table 556. In response to receiving a request to schedule a thread indicative of a VP, such as VP 534, scheduler 552 can determine the seed for VP 534 and access cache hierarchy table 556 to determine the available LP that shares the highest level of cache with the seed. Scheduler 552 can then schedule the thread on an available LP that shares the highest level of cache with the seed.

Turning to operation 716, it shows causing the list of idle logical processors to be generated from a list of logical processors in a specific NUMA node. Hypervisor 550 can be configured to maintain idle processor maps for each NUMA node in the computer system. In this example, each virtual processor could be assigned an ideal NUMA node when virtual machine 530 is started and this information could be stored in thread table 560. When scheduler 552 runs it can determine that a thread has been assigned an ideal NUMA node and scheduler 552 can generate the list of idle processors from an idle processor map associated with the ideal NUMA node. In this way the initial set of possible logical processor candidates is reduced. In a specific example, NUMA node 500 could be the ideal NUMA node for thread indicative of virtual processor 534. Scheduler 552 can obtain this information from thread table 560; access idle processor map 554; and generate a list of idle processors in NUMA node 500.

Continuing with the description of FIG. 7, operation 718 shows causing a virtual cache topology to be exposed to a guest operating system, wherein the virtual cache topology is based on physical cache topologies of a plurality of computer systems. For example, and turning to FIG. 5, hypervisor 550 can obtain configuration information that describes how to generate a virtual cache topology for virtual machine 530. In an embodiment, hypervisor 550 can generate the information or, in a datacenter embodiment, it can receive the configuration information from, for example, management system 402 of FIG. 4. The configuration information can describe a virtual cache topology that can be exposed to guest operating system 532 when it boots. Guest operating system 532 can then detect the topology and configure it's scheduler to depend on it. For example, guest operating system 532 can query the hardware to determine the topology. Hypervisor 550 can intercept the query and respond with virtualized information that describes the virtual cache topology. In this example, the virtual cache topology can be independent from the physical topology of the host computers system so that guest operating system 532 can be easily migrated to any computer system in datacenter 400.

Figure 8:
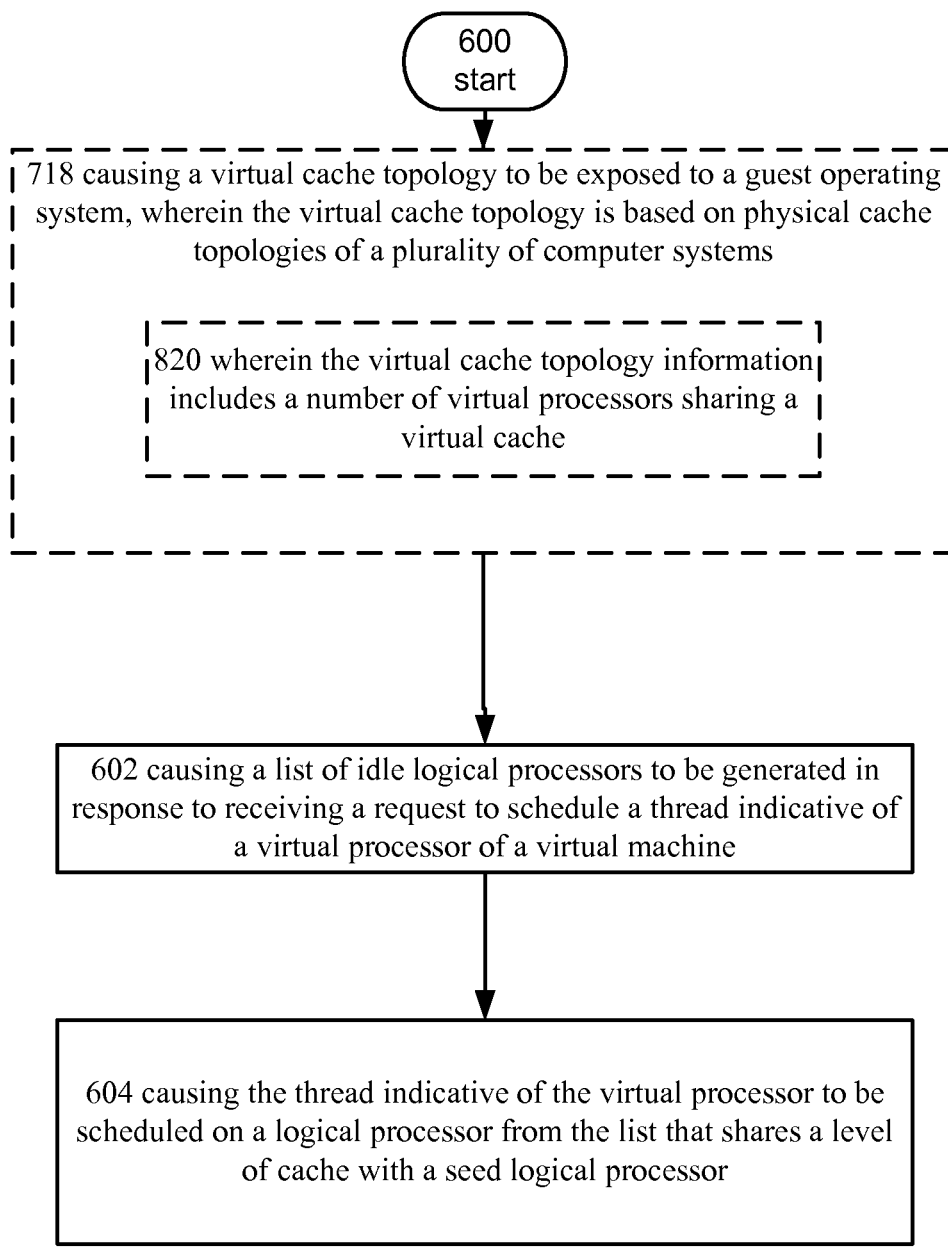
FIG. 8 depicts operational procedure.

Turning now to FIG. 8, it illustrate an alternative embodiment of the operational procedure depicted in FIG. 7. FIG. 8 includes a refinement 820 of operation 718, wherein the virtual cache topology information includes a number of virtual processors sharing a virtual cache. For example, hypervisor 500 or management system 402 of datacenter 400 can be configured to generate the virtual cache topology exposed to guest operating system 532. The virtual cache topology can include a calculated number of virtual processors that share a virtual cache. In an example, the number of processors can be determined by calculating the greatest common divisor of logical processors that share a lowest level of cache for each NUMA node in datacenter 400. For example, each computer system can have a topology the same as the physical topology described in FIG. 5 and management system 402 can be configured to determine the lowest level of cache in each NUMA node, e.g., L3 cache in this example, and determine the number of logical processors in each NUMA node that shares this level of cache, i.e., 6 in NUMA node 500 and 4 in NUMA node 502. Management system 402 can then determine that the greatest common divisor between 6 and 4 is 2. This value can be set as the number of virtual processors that share a level of cache in the virtual cache topology.

In another example, the number of virtual processors that share a level of cache in the virtual cache topology can be calculated using a different technique. For example, management system 402 can determine the number of logical processors that share a highest level of cache in each NUMA node. Management system 402 can then set the smallest number of logical processors as the number of virtual processors that share a level of cache in the virtual cache topology. For example, management 402 can receive information that describes that L2 is the highest cache shared by logical processors 506-512, L2 is the highest cache shared between logical processors 514-516, and L3 is the highest level of cache shared between logical processors 518-524. Management system 402 can then determine that 4, 2, and 4, logical processors share respective highest levels of cache in the computer systems in, for example datacenter 400. In this example embodiment management system 402 can select the smallest number (2) and set it as the number of virtual processors that share a level of cache in the virtual cache topology.

Figure 9:
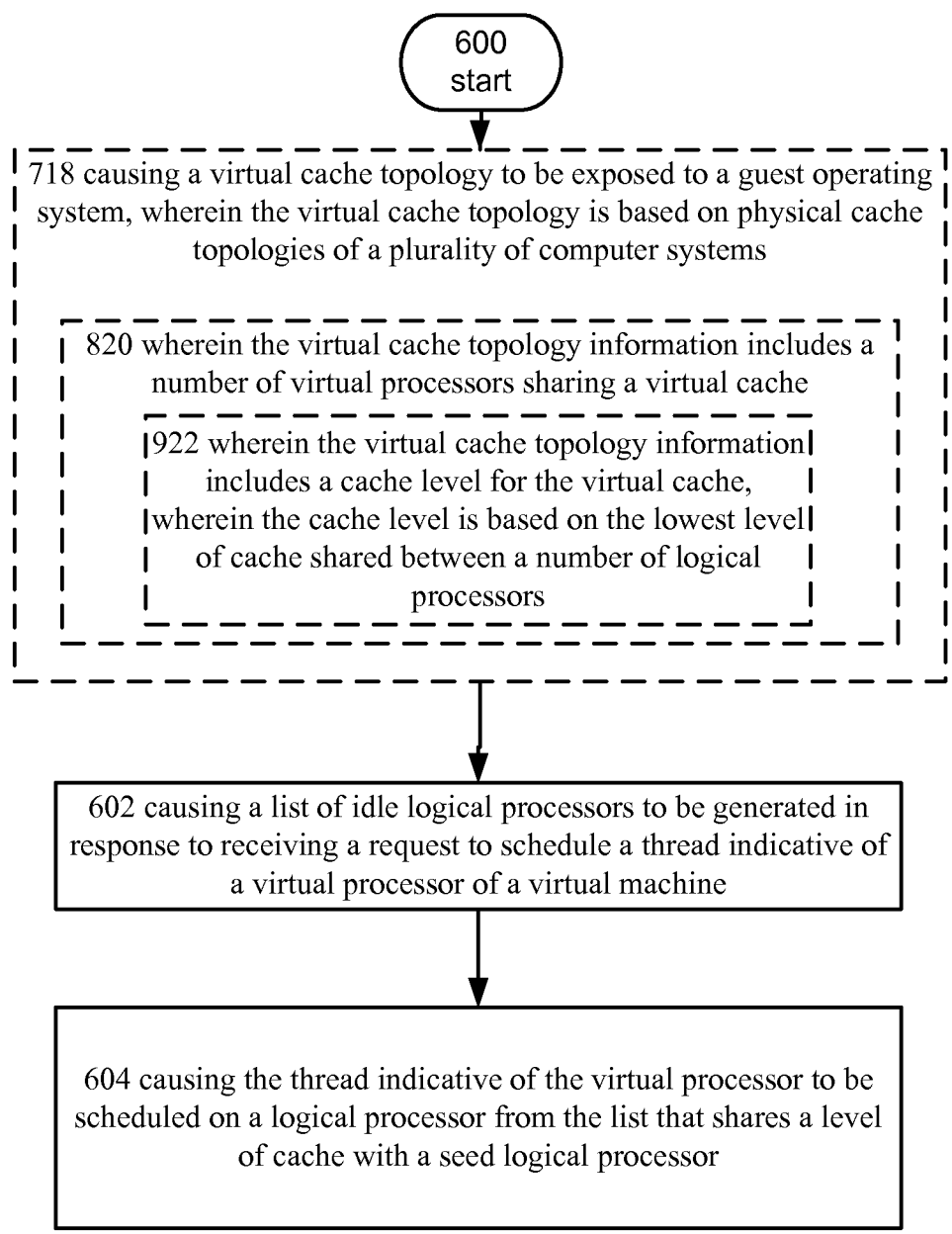
FIG. 9 depicts an alternative embodiment of the operational procedure of FIG. 8.

Turning now to FIG. 9, shown is refinement 922 of operation 820, wherein the virtual cache topology information includes a cache level for the virtual cache, wherein the cache level is based on the lowest level of cache shared between a number of logical processors. For example, after the number of virtual processors for the virtual cache topology is determined, the type of virtual cache that is shared can be determined. In an example embodiment the lowest type of cache shared by a number of logical processors equal to or greater to the determined number of virtual processors can be used as the virtual cache.

For example, are referring to FIG. 5, management system 402 can be configured to receive information describing that NUMA node 500 includes an L2 cache that is shared between 4 logical processors, an L2 cache shared between 2 logical processors, and an L3 cache shared between 6 logical processors. Management system 402 can also receive information that describes that NUMA node 502 includes an L3 cache shared between 4 logical processors. In this example, management system 402 can determine that NUMA node 500 can support an L2 and L3 cache shared between a number of logical processors equal or greater than the number of virtual processors set for the virtual cache topology. Management system 402 can also determine that NUMA node 502 can support an L3 cache shared between a number of logical processors equal or greater than the number of virtual processors set for the virtual cache topology. Management system 402 can select L3 as the cache to expose in virtual cache topology because it is the lowest cache that can be honored by each NUMA node.

Figure 10:
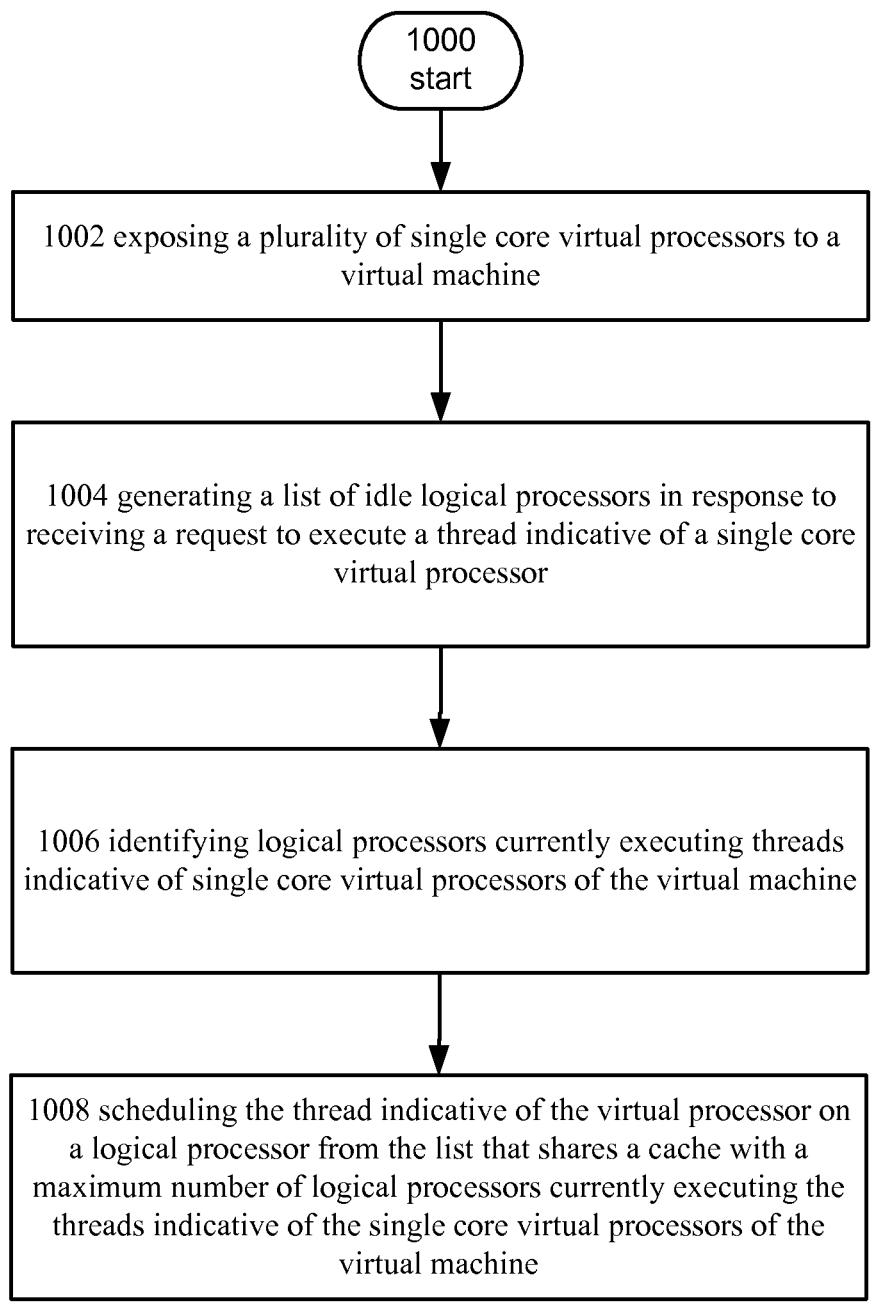
FIG. 10 depicts operational procedure.

Turning now to FIG. 10, it illustrates an operational procedure including operations 1000, 1002, 1004, 1006, and 1008. Operation 1000 begins the operational procedure and operation 1002 shows exposing a plurality of single core virtual processors to a virtual machine. For example, and turning to FIG. 5, a computer system can execute instructions indicative of hypervisor 550 and can load instructions operable to instantiate virtual machine 530. Hypervisor 550 can set up virtual machine 530 to include a plurality of virtual processors such as virtual processors 534-540. In this example, the virtual processors can be single core VPs. Put another way, the virtual processors 534-540 may not share caches. Guest operating system 532 can boot and detect the single cored virtual processors by querying the virtual topology. Hypervisor 550 can intercept the query and return a virtualized topology including a plurality of single core virtual processors.

Continuing with the description of FIG. 10, operation 1004 shows generating a list of idle logical processors in response to receiving a request to execute a thread indicative of a single core virtual processor. For example, an executing instance of hypervisor 550 can be set to generate a list of idle logical processors in the event that it receives a request to schedule a thread indicative of a virtual processor such as virtual processor 540. For example, executable instructions of scheduler 552 can be loaded into memory that set up idle processor maps for the logical processors in a computer system and hypervisor can be configured to run scheduler 552, which can generate a list of idle logical processors, in response to receiving a thread from a guest such as guest operating system 532.

Turning now to operation 1006, it shows identifying logical processors currently executing threads indicative of single core virtual processors of the virtual machine. Continuing with the example, in response to a request to run a thread indicative of a virtual processor, such as VP 540, hypervisor 550 can determine where threads indicative of the virtual processors of the VM are currently executing. For example, each time a logical processor runs it can update thread table 560 with information that identifies which virtual processor it is running When hypervisor 550 runs, it can check thread table 560 and see what logical processors are currently running virtual processors for the virtual machine. For example, virtual processor 534 can be executing on logical processor 514, virtual processor 536 can be executing on LP 516, and virtual processor 538 can be executing on virtual processor 512.

Turning now to operation 1008, it shows scheduling the thread indicative of the virtual processor on a logical processor from the list that shares a cache with a maximum number of logical processors currently executing the threads indicative of the single core virtual processors of the virtual machine. For example, scheduler 552 can determine which idle logical processor shares a cache the maximum number of logical processors currently running threads indicative of the other VPs in the virtual machine. For example, scheduler 552 can access cache hierarchy table 556, which can include an array of bitmaps for each logical processor, and determine which of the available processors shares a cache with the max number of LPs. Continuing with the example from above, scheduler 552 can schedule thread indicative of virtual processor 540 on logical processor 506 since logical processor 506 shares cache with the maximum number of currently executing virtual processors.

Figure 11:
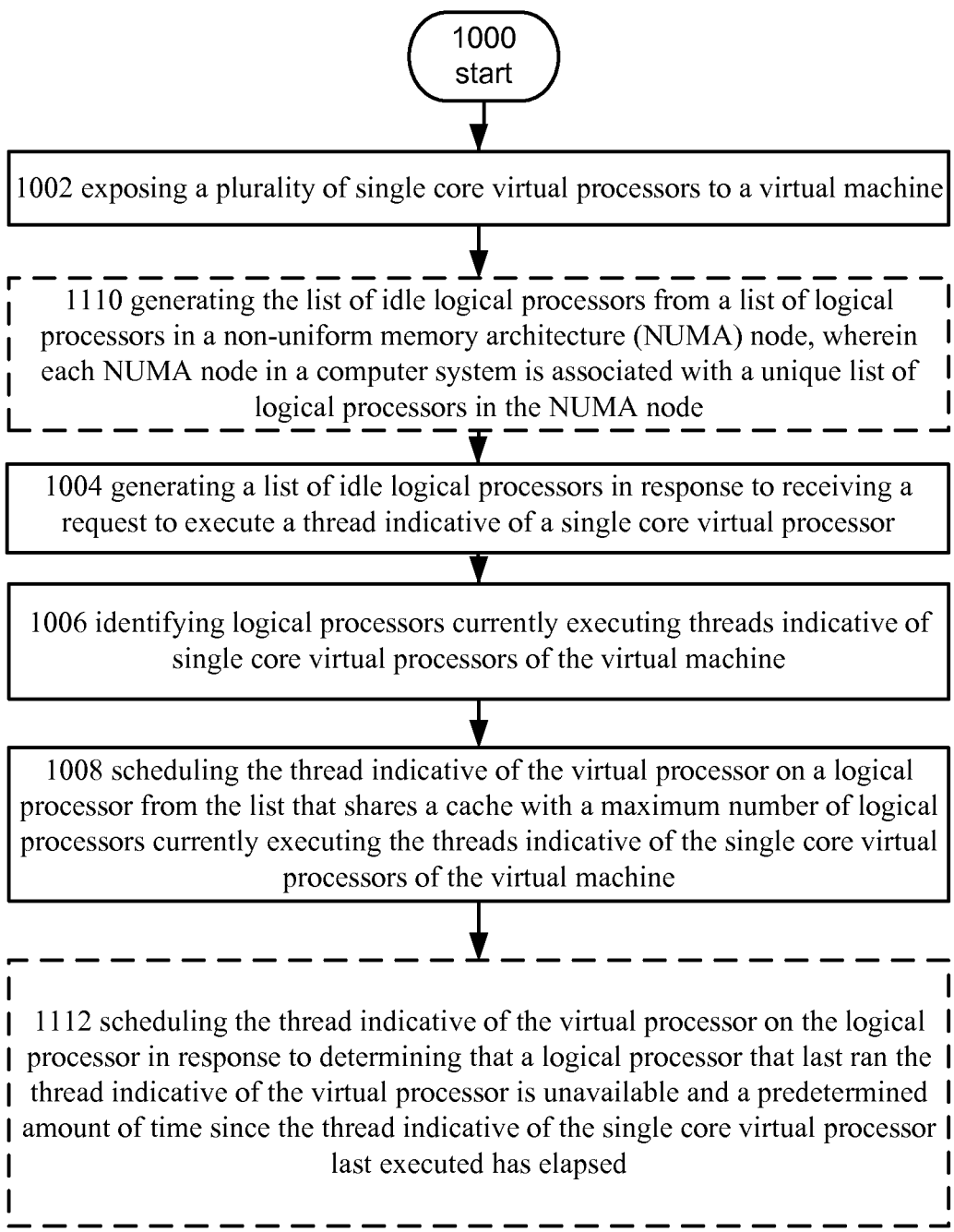
FIG. 11 depicts an alternative embodiment of the operational procedure of FIG. 10.

Turning now to FIG. 11, it shows an alternative embodiment of the operational procedure of FIG. 10 including operations 1110 and 1112. Operation 1110 shows generating the list of idle logical processors from a list of logical processors in a non-uniform memory architecture (NUMA) node, wherein each NUMA node in a computer system is associated with a unique list of logical processors in the NUMA node. For example, scheduler 552 can be configured to schedule the thread on a logical processor that shares a highest level of cache with a maximum amount of virtual processors currently running. For example, in an embodiment scheduler 552 may determine that there are multiple available logical processors that share cache with a maximum number of logical processors. In this example, scheduler 552 can be configured to select the logical processor that shares the highest cache with the most logical processors. For example, in an embodiment logical processors 508-514 may be running 4 virtual processors of a virtual machine including 5 virtual processors. Scheduler 552 may determine that LP 506 and LP 516 are available and each share L3 cache with the logical processors currently running virtual processors of the virtual machine. In this example scheduler 552 can determine that logical processor 506 shares L2 cache with 3 of the 4 logical processors and LP 516 shares L2 cache with 1 logical processor. In this example scheduler 552 can select logical processor 506.

Continuing with the description of FIG. 11, operation 1112 shows scheduling the thread indicative of the virtual processor on the logical processor in response to determining that a logical processor that last ran the thread indicative of the virtual processor is unavailable and a predetermined amount of time since the thread indicative of the single core virtual processor last executed has elapsed. For example, scheduler 552 may determine that the thread is associated with a latency sensitive workload. That is, the workload, e.g., the programs executed by guest operating system 532, may need to be scheduled as soon as possible when it is received by scheduler 552. In this example, if a predetermined amount of time since the VP last ran has elapsed, schedule 552 can be scheduled to access cache hierarchy table 556 and determine which available logical processors share cache with, for example, the logical processor that last ran it or one that shares a cache with a maximum number of logical processors currently executing virtual processors of the virtual machine.

Figure 12:
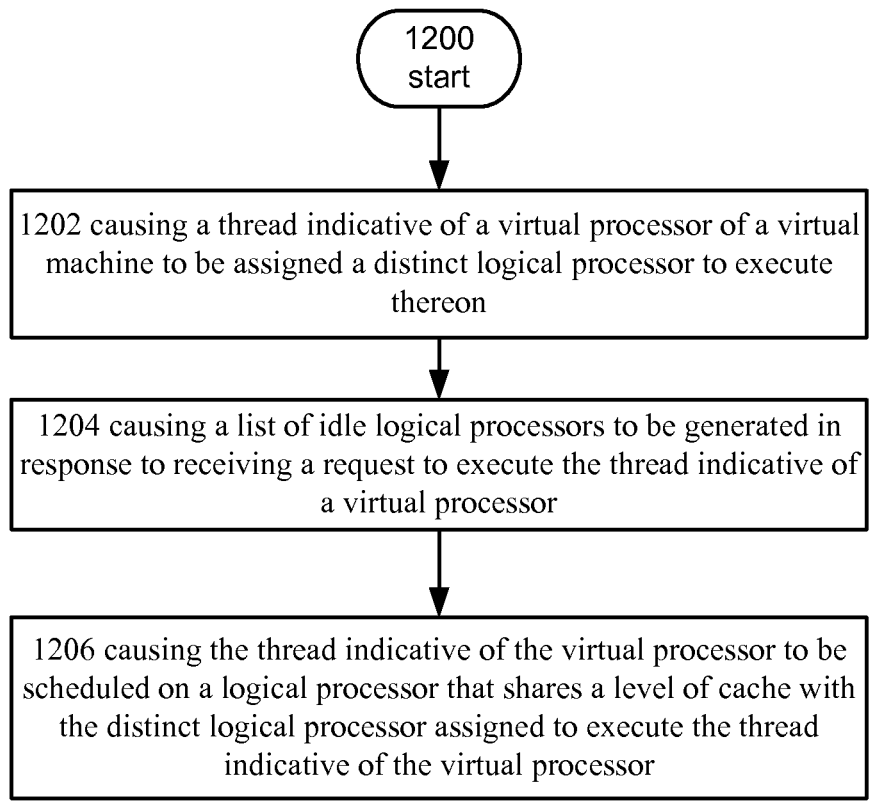
FIG. 12 depicts an operational procedure.

Turning now to FIG. 12, it illustrates a operational procedure including operations 1200, 1202, 1204, and 1206. Operation 1200 begins the procedure and operation 1202 shows causing a thread indicative of a virtual processor of a virtual machine to be assigned a distinct logical processor to execute thereon. In an embodiment, hypervisor 550 can assign each virtual processor of a virtual machine a distinct logical processor. In this example, when a request to schedule the virtual processor is received, hypervisor 550 can attempt to schedule the virtual processor on the assigned logical processor. For example, thread table 560 can store information that identifies the assigned logical processor. Scheduler 552 can check thread table 560 when it receives a request to schedule a thread.

Continuing with the description of FIG. 12, operation 1204 shows causing a list of idle logical processors to be generated in response to receiving a request to execute the thread indicative of a virtual processor. For example, an executing instance of hypervisor 550 can be set to generate a list of idle logical processors in the event that it receives a request to schedule a thread indicative of a virtual processor such as virtual processor 540. For example, executable instructions of scheduler 552 can be loaded into memory that set up idle processor maps for the logical processors in a computer system and hypervisor can be configured to run scheduler 552, which can generate a list of idle logical processors, in response to receiving a thread from a guest such as guest operating system 532.

Turning back again to FIG. 12, operation 1206 shows causing the thread indicative of the virtual processor to be scheduled on a logical processor that shares a level of cache with the distinct logical processor assigned to execute the thread indicative of the virtual processor. For example, scheduler 552 can determine which idle logical processors share a cache with the assigned logical processor and select one. For example, scheduler 552 can access cache hierarchy table 556, which can include an array of bitmaps for each logical processor, and determine which of the available processors shares a cache with assigned logical processor.

Figure 13:
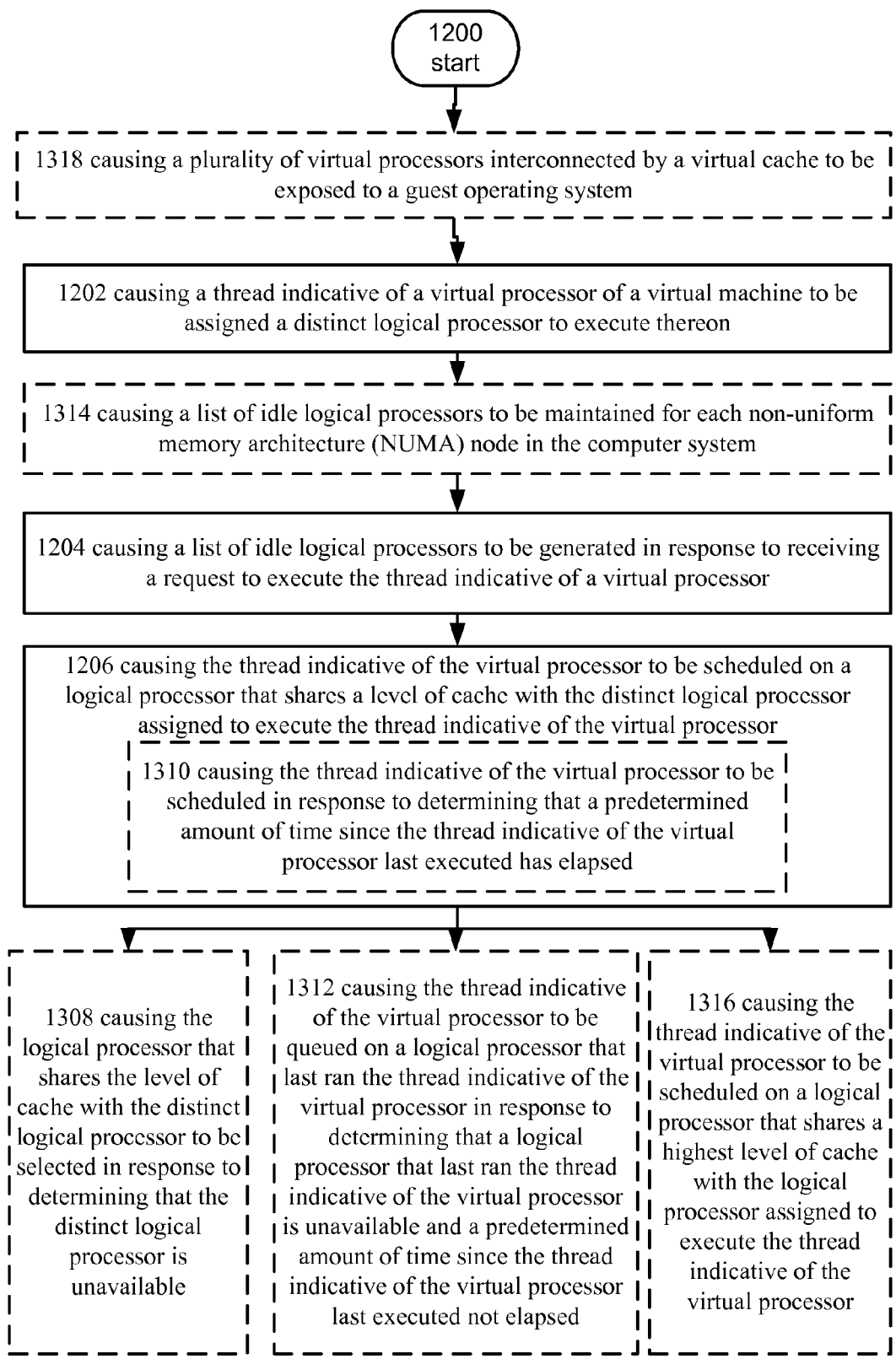
FIG. 13 depicts an alternative embodiment of the operational procedure of FIG. 12.

Referring now to FIG. 13, it illustrate an alternative embodiment of the operational procedure illustrated in FIG. 12 including the additional operations 1308, 1310, 1312, 1314, 1316, and 1318. Operation 1308 shows causing the logical processor that shares the level of cache with the distinct logical processor to be selected in response to determining that the distinct logical processor is unavailable. For example, scheduler 552 can be configured to attempt to schedule thread indicative of a virtual processor on the assigned logical processor. In the event that the processor is unavailable, it can schedule the thread indicative of the virtual processor on a logical processor that shares a level of cache with a logical processor assigned to execute the thread indicative of the virtual processor.

Operation 1310 shows causing the thread indicative of the virtual processor to be scheduled in response to determining that a predetermined amount of time since the thread indicative of the virtual processor last executed has elapsed. For example, in an embodiment scheduler 552 can be configured to locate a logical processor to run a latency sensitive workload. That is, the workload, e.g., the programs executed by guest operating system 532, may need to be scheduled as soon as possible when it is received by scheduler 552. In this example, if a predetermined amount of time since the VP last ran has elapsed, schedule 552 can be scheduled to access cache hierarchy table 556 and determine which available logical processors share cache with, for example, the assigned logical processor.

Operation 1312 shows causing the thread indicative of the virtual processor to be queued on a logical processor that last ran the thread indicative of the virtual processor in response to determining that a logical processor that last ran the thread indicative of the virtual processor is unavailable and a predetermined amount of time since the thread indicative of the virtual processor last executed not elapsed. In an embodiment, thread indicative of virtual processor 534 could be a latency sensitive thread. In this example, scheduler 552 can include instructions for queuing the thread in the instance that logical processor 506 is unavailable and the predetermined amount of time has not elapsed. In this example, a decision can be made that the savings do to having cache hits will offset the fact that the latency sensitive thread is not executed as soon as possible. As stated above, the predetermined threshold can be set based on performance characteristics of the system and may be adjusted by an administrator or a policy.

Operation 1314 shows causing a list of idle logical processors to be maintained for each non-uniform memory architecture (NUMA) node in the computer system. For example, hypervisor 550 can be configured to maintain idle processor maps for each NUMA node in the computer system. In this example, the NUMA node that includes the assigned processors can be set as the node that scheduler 552 first checks in response to receiving a request to schedule a thread. When scheduler 552 runs, it can generate the list of idle processors from an idle processor map associated with NUMA node. In this way the initial set of possible logical processor candidates is reduced without having to check a bitmap listing every logical processor in the computer system.

Operation 1316 shows causing the thread indicative of the virtual processor to be scheduled on a logical processor that shares a highest level of cache with the logical processor assigned to execute the thread indicative of the virtual processor. For example, scheduler 552 can be configured to attempt to collocate virtual processors such that they share the highest level of cache. In this example, guest 532 has the best chance of seeing a performance increase due to cache hits. As described above, each logical processor can have arrays associated therewith stored in cache hierarchy table 556. In response to receiving a request to schedule a thread indicative of a VP, such as VP 534, scheduler 552 can determine the seed for VP 534 and access cache hierarchy table 556 to determine the available LP that shares the highest level of cache with the assigned logical processor. Scheduler 552 can then schedule the thread on an available LP that shares the highest level of cache with the assigned logical processor.

Operation 1318 shows causing a plurality of virtual processors interconnected by a virtual cache to be exposed to a guest operating system. For example, and turning to FIG. 5, hypervisor 550 can obtain configuration information that describes how to generate a virtual cache topology for virtual machine 530. In an embodiment, hypervisor 550 can generate the information or, in a datacenter embodiment, it can receive the configuration information from, for example, management system 402 of FIG. 4. The configuration information can describe a virtual cache topology that can be exposed to guest operating system 532 when it boots. Guest operating system 532 can then detect the topology and configure it's scheduler to depend on it. For example, guest operating system 532 can query the virtual processors to determine the topology. Hypervisor 550 can intercept the query and respond with topology information that describes the virtual cache topology. In this example, the virtual cache topology can be independent from the physical topology of the host computers system so that guest operating system 532 can be easily migrated to any computer system in datacenter 400.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer system including a plurality of non-uniform memory access (NUMA) nodes, each NUMA node including a plurality logical processors, wherein the computer system includes a computer readable storage medium comprising:
   instructions that when executed by the computer system cause a list of idle logical processors to be generated in response to receiving a request to schedule a thread indicative of a virtual processor of a virtual machine; and
   instructions that when executed by the computer system cause the thread indicative of the virtual processor to be scheduled on a logical processor from the list that shares a level of cache with a seed logical processor.

2. The computer system of claim 1, wherein the computer readable storage medium further comprises:
   instructions that when executed by the computer system cause the thread indicative of the virtual processor to be scheduled on a logical processor that shares a level of cache with the seed logical processor in response to determining that a logical processor that last ran the thread indicative of the virtual processor is unavailable and a predetermined amount of time since the thread indicative of the virtual processor last executed has elapsed.

3. The computer system of claim 1, wherein the computer readable storage medium further comprises:
   instructions that when executed by the computer system cause the thread indicative of the virtual processor to be queued on a logical processor that last ran the thread indicative of the virtual processor in response to determining that the logical processor that last ran the thread indicative of the virtual processor is unavailable and a predetermined amount of time since the thread indicative of the virtual processor last executed not elapsed.

4. The computer system of claim 1, wherein the computer readable storage medium further comprises:
instructions that when executed by the computer system cause the logical processor that last executed the thread indicative of the virtual processor to be set as the seed logical processor.

5. The computer system of claim 1, wherein the computer readable storage medium further comprises:
instructions that when executed by the computer system cause an ideal logical processor to be set as the seed logical processor.

6. The computer system of claim 1, wherein instructions that cause the thread indicative of the virtual processor to be scheduled further comprise:
instructions that when executed by the computer system cause the thread indicative of the virtual processor to be scheduled on a logical processor from the list that shares the highest level of cache with the seed logical processor.

7. The computer system of claim 1, wherein instructions that cause the list of idle logical processors to be generated further comprise:
instructions that when executed by the computer system cause the list of idle logical processors to be generated from a list of logical processors in a specific NUMA node.

8. The computer system of claim 1, wherein the computer readable storage medium further comprises:
instructions that when executed by the computer system cause a virtual cache topology to be exposed to a guest operating system, wherein the virtual cache topology is based on physical cache topologies of a plurality of computer systems.

9. The computer system of claim 8, wherein the virtual cache topology information includes a number of virtual processors sharing a virtual cache.

10. The computer system of claim 9, wherein the virtual cache topology information includes a cache level for the virtual cache, wherein the cache level is based on the lowest level of cache shared between a number of logical processors.

11. A computer implemented method for scheduling threads indicative of virtual processors on logical processors, comprising:
exposing a plurality of single core virtual processors to a virtual machine;
generating a list of idle logical processors in response to receiving a request to execute a thread indicative of a single core virtual processor;
identifying logical processors currently executing threads indicative of single core virtual processors of the virtual machine; and
scheduling the thread indicative of the virtual processor on a logical processor from the list that shares a cache with a maximum number of logical processors currently executing the threads indicative of the single core virtual processors of the virtual machine.

12. The computer implemented method of claim 11, further comprising:
generating the list of idle logical processors from a list of logical processors in a non-uniform memory architecture (NUMA) node, wherein each NUMA node in a computer system is associated with a unique list of logical processors in the NUMA node.

13. The computer implemented method of claim 11, wherein scheduling the thread indicative of the virtual processor further comprises:

scheduling the thread indicative of the virtual processor on the logical processor in response to determining that a logical processor that last ran the thread indicative of the virtual processor is unavailable and a predetermined amount of time since the thread indicative of the single core virtual processor last executed has elapsed.

14. A computer readable storage medium, comprising:
instructions that when executed by a computer system cause a thread indicative of a virtual processor of a virtual machine to be assigned a distinct logical processor to execute thereon;
instructions that when executed by the computer system cause a list of idle logical processors to be generated in response to receiving a request to execute the thread indicative of a virtual processor; and
instructions that when executed by the computer system cause the thread indicative of the virtual processor to be scheduled on a logical processor that shares a level of cache with the distinct logical processor assigned to execute the thread indicative of the virtual processor.

15. The compute readable storage medium of claim 14, further comprising:
instructions that when executed by the computer system cause the logical processor that shares the level of cache with the distinct logical processor to be selected in response to determining that the distinct logical processor is unavailable.

16. The computer readable storage medium of claim 14, wherein the instructions that cause the thread indicative of the virtual processor to be scheduled further comprise:
instructions that when executed by the computer system cause the thread indicative of the virtual processor to be scheduled in response to determining that a predetermined amount of time since the thread indicative of the virtual processor last executed has elapsed.

17. The computer readable storage medium of claim 14, further comprising:
instructions that when executed by the computer system cause the thread indicative of the virtual processor to be queued on a logical processor that last ran the thread indicative of the virtual processor in response to determining that a logical processor that last ran the thread indicative of the virtual processor is unavailable and a predetermined amount of time since the thread indicative of the virtual processor last executed not elapsed.

18. The computer readable storage medium of claim 14, further comprising:
instructions that when executed by the computer system cause a list of idle logical processors to be maintained for each non-uniform memory architecture (NUMA) node in the computer system.

19. The computer readable storage medium of claim 14, wherein the instructions that cause the thread indicative of the virtual processor to be scheduled further comprise:
instructions that when executed by the computer system cause the thread indicative of the virtual processor to be scheduled on a logical processor that shares a highest level of cache with the logical processor assigned to execute the thread indicative of the virtual processor.

20. The computer readable storage medium of claim 14, further comprising:
instructions that when executed by the computer system cause a plurality of virtual processors interconnected by a virtual cache to be exposed to a guest operating system.

* * * * *